July 7, 1964   B. V. DORE   3,139,754
ELECTRONIC VACUUM GAUGE
Filed June 15, 1961

INVENTOR.
BURNELL V. DORE
BY John F Fowler
ATTORNEY

United States Patent Office 3,139,754
Patented July 7, 1964

3,139,754
ELECTRONIC VACUUM GAUGE
Burnell V. Dore, Sunnyvale, Calif., assignor to Sylvania Electric Products Inc., a corporation of Delaware
Filed June 15, 1961, Ser. No. 117,422
3 Claims. (Cl. 73—398)

This invention relates to vacuum gauges, and more particularly to an electronic vacuum gauge with a solid state pressure sensing head.

There is a need for a simple reliable vacuum gauge that is capable of detecting and measuring absolute pressures over a wide range. Present gauges constructed with bellows, or which monitor gas thermal conductivity or ionization as a means of measuring vacuums are costly to build and maintain, are bulky, and are sensitive to mechanical shock. Such gauges also require complicated gas sealing containers as well as complex associated external circuitry to amplify and record pressure.

An object of this invention is the provision of a vacuum measuring system capable of reliably reading pressures over a wide range.

A further object is to provide a vacuum gauge having a solid state sensing head.

Another object is the provision of such a gauge having extremely simple associated read-out circuitry.

A further object is the provision of a lightweight compact vacuum gauge with total power requirements of a few milliwatts.

A more specific object is the provision of a solid state vacuum gauge capable of sensing small pressures and producing electric signals that are readable on measuring instruments in pressure units without additional amplification.

In accordance with this invention, a thin layer of semiconductor material intimately bonded to and sandwiched between two metal layers is utilized as a pressure sensing element. Leads electrically connected to the two metal layers and to a direct current source apply a unidirectional bias voltage to the semiconductor layer. With a semiconductor layer of proper thickness and composition, electrons tunnel across the semiconductor layer from one metal to the other. The magnitue of this unidirectional "tunneling" current is directly related to ambient pressure, and changes in that pressure produce significant changes in current. Measuring the value of "tunneling" current provides a direct reading of pressure.

This solid state sensing head is extremely sensitive to pressure effects and produces significant directly readable changes in circuit current for small incremental pressure changes. Conventional ammeters may be used to detect change in current without further amplification. The circuitry for this system is therefore relatively simple and compact. Because the sensing head is a solid state device, no elaborate gas seals or electron discharge mechanisms are required, and the entire system is correspondingly easy to install and maintain.

The objects of the invention and the manner in which they are achieved will be better understood by a reading of the following description of a preferred embodiment shown in the drawings in which.

Figure 1:
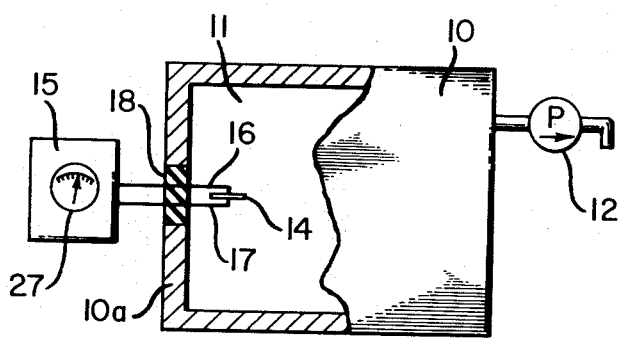
FIGURE 1 is a schematic view of a vacuum gauge embodying this invention used in conjunction with a vacuum chamber.

Referring now to the drawings, FIGURE 1 shows a housing 10 enclosing a vacuum chamber 11 which is connected to an exhaust pump 12. Such a chamber may be useful for environmental test work, or may constitute the interior of an electron discharge device, or may be any low pressure environment.

Detection and measurement of pressure changes within chamber 11 is made by a vacuum gauge comprising a solid state pressure sensing head 14 located within the chamber, and exteriorly disposed measuring equipment 15 connected to the sensing head 14 by conductors 16 and 17 which extend through a hermetic seal 18 in wall 10a of housing 10.

Figure 2:
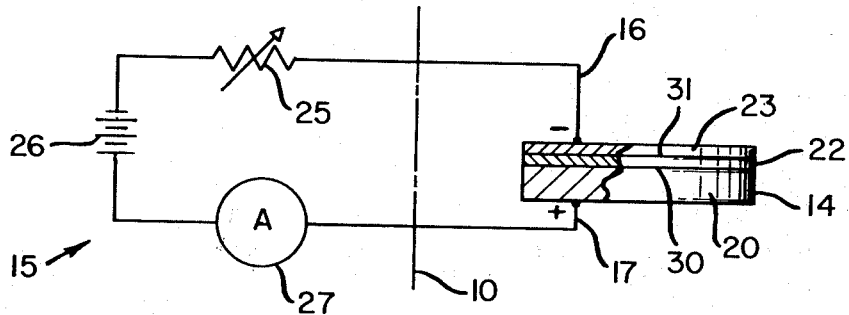
FIGURE 2 is an enlarged schematic view of the vacuum measuring apparatus with the solid state sensing head greatly enlarged (not to scale)

Pressure sensing head 14 comprises a conductor or substrate 20, see FIGURE 2, a relatively thin layer or film of semiconductor material 22 intimately bonded to one face of the substrate, and a metallic conductor layer 23 in close contact with the opposite face of the semiconductor layer. The head 14 therefore comprises a semiconductor film sandwiched between and bonded to two conductors. Leads 16 and 17 are electrically connected to the layer 23 and substrate 20, respectively, and make a series connection externally with a variable resistor 25, a source 26 of unidirectional bias potential, shown as a battery, and an ammeter 27—all of which comprise the external measuring apparatus 15.

Sensing head 14 may be made as follows. A thin sheet of tantalum sheet metal 0.010 to 0.020 inch thick, is anodized to form a semiconductor layer 22 of tantalum oxide ($Ta_2O_5$). The thickness of the layer 22 is in the order of 400 Angstrom units. The anodized substrate is then exposed to a gold vapor which deposits on semiconductor layer 22 to form a layer of gold, preferably about 1000 Anstrom units thick, and this constitutes the surface layer 23 of the head. Wire leads 16 and 17 are bonded to opposing faces of the substrate 20 and surface layer 23 to complete the structure. The polarity of the biasing voltage is such that substrate 20 is connected to the positive side and surface layer 23 to the negative side. The entire sensing head 14, in practical form, is approximately 0.010 inch thick and 0.250 inch square and has negligible weight.

The bias voltage applied to conductors 20 and 23 of sensing head 14 is adjusted by varying the effective value of resistor 25. Through proper selection of type and thickness of the semiconductor layer 22, and with appropriate adjustment of the biasing potential, a current flow is established through the sensing head which bears a definite relationship to the absolute value of the pressure in chamber 11. As this pressure changes, the current flow also changes significantly so that the ammeter 27 gives readings that are proportional to pressure.

This action is explained by the phenomenon of electron tunneling within the sensing head 14. When a bias potential is applied across the semiconductor film 22 of proper thickness, electrons in conductor layer 23 tunnel across the semiconductor layer to substrate 20. It is believed (though no verification of this belief has been made) that the junction resistance encountered by electrons at the interfaces 31 and 30 of the sensing head, has a pronounced effect on the magnitude of tunneling current. A very slight change in this junction resistance occasioned by change in pressure in chamber 11 of a few microns of mercury is believed to have a magnified effect on current flow in the circuit. In any event, the observed transducer effect is sufficiently amplified within the sensing head 14 itself that external supplementary amplifiers are unnecessary.

Figure 3:
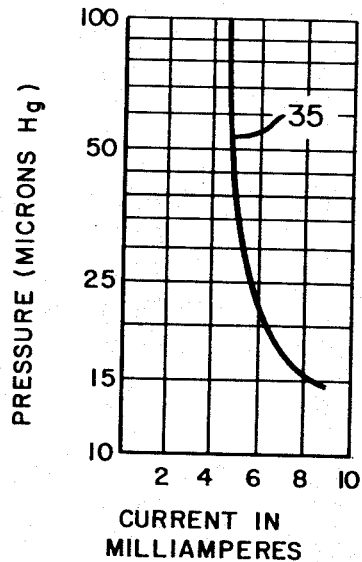
FIGURE 3 is a plot of tunneling current versus ambient pressure.

By way of example, a pressure sensing head 14 comprising tantalum, tantalum oxide (400 Angstrom units thick) and gold (1000 Angstrom units thick) with a 6 volt bias transmitted a current of 2 milliamperes in air at one atmosphere, 5 milliamperes at 100 microns of mercury, and 8.4 milliamperes at 15 microns of mercury. Curve 35 in FIGURE 3 shows the actual change in current over the lower band of the pressure range for the sensing head described above.

Changes in and modifications to the above described embodiment of my invention may be made by those skilled in the art without departing from the precepts of the invention. The scope of the invention is defined in the appended claims.

I claim:

1. A vacuum gauge having a sensing head comprising a metallic substrate, a semiconductor layer intimately bonded to a surface of the substrate and consisting of an oxide of said substrate, and a metallic layer intimately bonded to said semiconductor layer; means for applying a bias voltage to said substrate and to said metallic layer, and means responsive to current flowing through the sensing head for indicating ambient pressure; said head and said bias voltage means and said current responsive means being connected together in electrical series.

2. A device for measuring air pressure comprising a source of voltage and an ammeter and a solid state sensing head connected in electrical series, said sensing head comprising a tantalum substrate, a thin layer of tantalum oxide formed on a surface of said substrate, and a layer of gold conductively engaging said oxide layer; said bias voltage being applied to said substrate and to said gold layer across said oxide layer.

3. A vacuum gauge having a sensing head comprising a metallic substrate, a semiconductor layer intimately bonded to a surface of the substrate and consisting of an oxide of the substrate, the thickness of said layer being less than 400 Angstrom units, and a metallic layer intimately bonded to said semiconductor layer; means for applying a bias voltage to said substrate and to said metallic layer, and means responsive to current flowing through the sensing head for indicating ambient pressure.

References Cited in the file of this patent

UNITED STATES PATENTS

| | | |
|---|---|---|
| 2,745,284 | Fitzgerald | May 15, 1956 |
| 2,766,509 | Loup et al. | Oct. 16, 1956 |
| 2,836,776 | Ichikawa et al. | May 27, 1958 |
| 2,880,497 | Hall | Apr. 7, 1959 |